US006403716B1

(12) United States Patent
Nishihara

(10) Patent No.: US 6,403,716 B1
(45) Date of Patent: Jun. 11, 2002

(54) THERMOPLASTIC RUBBER COMPOSITION

(75) Inventor: Hajime Nishihara, Yokohama (JP)

(73) Assignee: Asahi Kasei Kabushiki Kaisha (JP)

( * ) Notice: Subject to any disclaimer, the term of this patent is extended or adjusted under 35 U.S.C. 154(b) by 0 days.

(21) Appl. No.: 09/614,442

(22) Filed: Jul. 12, 2000

(30) Foreign Application Priority Data

Jul. 12, 1999 (JP) .......................................... 11-197089

(51) Int. Cl.[7] ......................... C08L 23/00; C08L 23/04; C08L 27/04; C08L 33/02; C08L 33/14

(52) U.S. Cl. ....................... 525/191; 525/213; 525/214; 525/221; 525/222; 525/227; 525/230; 525/232; 525/233; 525/235; 525/237; 525/238; 525/239; 525/240; 525/241

(58) Field of Search ................................ 525/191, 213, 525/214, 221, 222, 227, 230, 232, 233, 235, 237, 238, 239, 240, 241

(56) References Cited

U.S. PATENT DOCUMENTS 4,822,855 A * 4/1989 Kobayashi et al. ......... 525/194
5,229,463 A * 7/1993 Yano et al. ................. 525/240
6,121,383 A * 9/2000 Abdou-Sabet et al. ...... 525/192

FOREIGN PATENT DOCUMENTS

JP 60-231747 A 11/1985
JP 1-231747 A 11/1989
JP 8-120127 A 5/1996
JP 9-137001 A 5/1997

* cited by examiner

*Primary Examiner*—Nathan M. Nutter
(74) *Attorney, Agent, or Firm*—Pennie & Edmonds LLP

(57) ABSTRACT

A thermoplastic rubber composition prepared by crosslinking 1-99 parts by weight of a crosslinkable rubbery polymer (A) and 1-99 parts by weight of a polypropylene resin (B) (total amount of (A) and (B) being 100 parts by weight), wherein said (B) comprises a polypropylene resin (B-1) characterized by generation of a torque higher than $M_o$ after melting and a polypropylene resin (B-2) characterized by generation of a torque not higher than $M_o$ after melting, in a melting test of said (B) in the presence of an organic peroxide (temperature condition being at 200° C.), and $M_o$ being a torque right after complete melting.

11 Claims, 2 Drawing Sheets

THERMOPLASTIC RUBBER COMPOSITION

BACKGROUND ART (1) Technical Field

This invention relates to a thermoplastic rubber composition. More particularly, this invention relates to a thermoplastic rubber composition with superior appearance, flexibility (feeling), mechanical strength and wear resistance.

(2) Description of the Related Art

A thermoplastic elastomer composition obtained by the so-called to speak dynamic crosslinking, that is crosslinking during melt mixing of a rubbery polymer such as a radically crosslinkable olefinic elastomer and a radically non-crosslinkable olefinic resin such as polypropylene (PP) in an extruder in the presence of a radical initiator, is already known technology and widely used in applications such as automotive parts.

As such an olefinic elastomer, ethylene-propylene-diene (EPDM) or an olefinic elastomer manufactured with a metallocene catalyst is known (JP-A-8-120127 and JP-A-9-137001). As the thermoplastic crosslinkable rubbers composed of an olefinic elastomer and a special polyolefin resin, a thermoplastic crosslinkable rubber composition consisting of an olefinic rubber, a decomposition type polyolefin and a crosslinking type polyolefin consisting of ethylene unit and α-olefin unit having 4–10 carbon atoms (JP-A-60-231747) and a thermoplastic crosslinkable rubber composition composed of an olefinic rubber, a decomposition type polypropylene, a crosslinking type polyethylene and the like (JP-A-1-295818) are also disclosed. However, any composition in the above publications is not sufficient in appearance, flexibility (feeling) and mechanical strength, and thus there remains a need to a high strength thermoplastic rubber composition durable to practical uses.

SUMMARY OF THE INVENTION

Considering these problems, the object of the present invention is to provide a thermoplastic rubber composition which does not have the above described problems and is superior in appearance, flexibility (feeling), mechanical strength and wear resistance and also enables stabilized quality due to an improved productivity.

The present inventors found out unexpectedly, after thorough study to get a thermoplastic rubber composition with superior mechanical strength, that combined use of a rubbery polymer and a thermoplastic resin with specified characteristics dramatically enhanced mechanical strength and wear resistance while maintaining appearance and flexibility, and thus completed the present invention.

The present invention provides a thermoplastic rubber composition prepared by crosslinking 1–99 parts by weight of a crosslinkable rubbery polymer (A) and 1–99 parts by weight of a polypropylene resin (B) (total amount of (A) and (B) being 100 parts by weight), wherein said (B) comprises a polypropylene resin (B-1) characterized by generation of a torque higher than $M_o$ after melting, and a polypropylene resin (B-2) characterized by generation of a torque not higher than $M_o$ after melting, in a melting test of said (B) in the presence of an organic peroxide (temperature condition being at 200° C.), wherein $M_o$ is a torque right after complete melting.

The present invention also provides a thermoplastic rubber composition prepared by crosslinking 1–99 parts by weight of an ethylene/α-olefin copolymer rubber of ethylene and an α-olefin with 3–20 carbon atoms (A') manufactured with a metallocene catalyst, and 1–99 parts by weight of a polyolefin resin (B') (total amount of (A') and (B') being 100 parts by weight), wherein said (B') includes a polyolefin resin (B-1') characterized by generation of a torque higher than $M_o$ after melting (preferably a polyethylene resin and/or a polyolefin resin comprising α-olefin units with 4–20 carbon atoms), and a polyolefin resin (B-2') (preferably a polypropylene based block copolymer resin or a polypropylene homopolymer resin) characterized by generation of a torque not higher than $M_o$ after melting, in a melting test of said (B') in the presence of an organic peroxide (temperature condition being at 200° C.), wherein $M_o$ is a torque right after complete melting.

A thermoplastic rubber composition of the present invention is superior in appearance, flexibility (feeling) and mechanical strength and enables stabilized quality due to an improved productivity.

A composition of the present invention can be used in wide applications including automotive parts, automotive interior parts, air bag covers, machine parts, electrical parts, cables, hoses, belts, toys, miscellaneous goods, daily necessaries, construction materials, sheets and films, and thus has a big industrial role.

DESCRIPTION OF THE PREFERRED EMBODIMENTS OF THE INVENTION

Figure 1A:
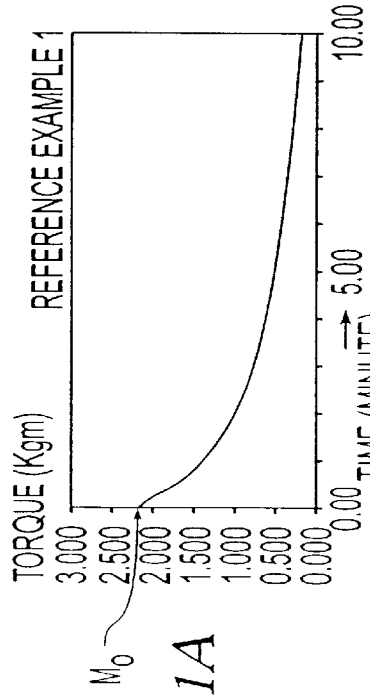
FIGS. 1A–1E show change of torque (kgm) measured by "LaboPlastomil" in Reference Examples 1–5.
Figure 1B:
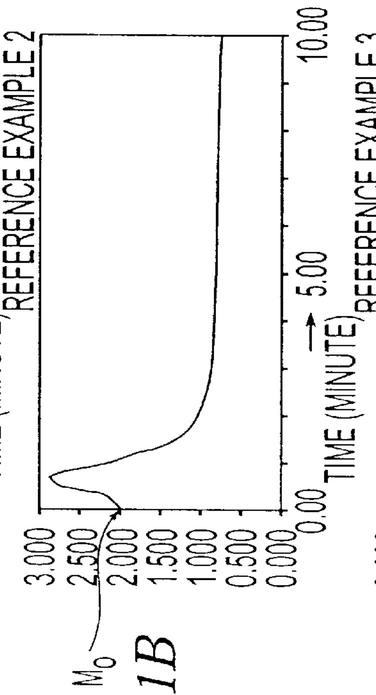
Figure 1C:
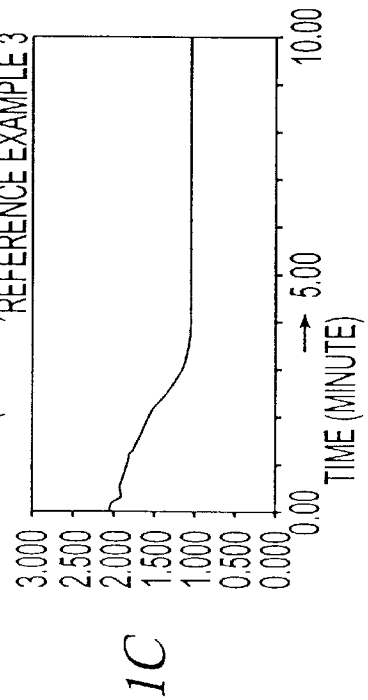
Figure 1D:
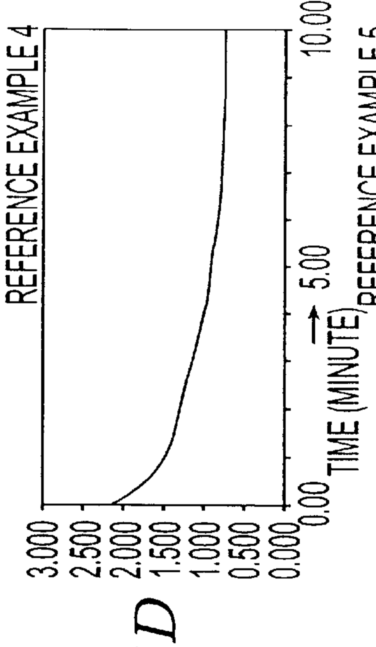
Figure 1E:
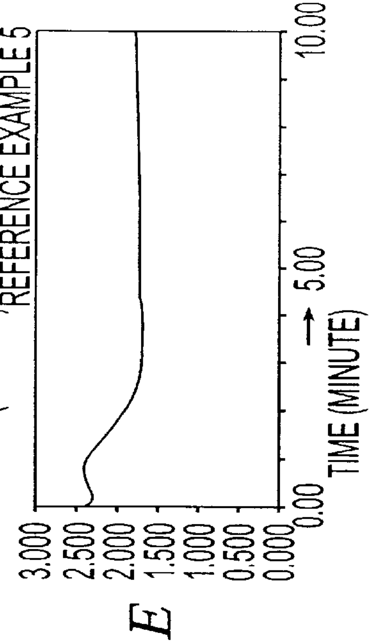

The composition of the present invention is composed of a specific rubbery polymer (A) or (A') and a specific polyolefin based resin (B) or (B')

As (B) or (B') in the invention, it is essential to use in combination of a crosslinking type resin characterized by generating a torque higher than $M_o$ after melting, and a decomposition type resin characterized by generation of a torque not higher than $M_o$ after melting, the torque being measured in a melting test prescribed in the specification. The present inventors found out that the presence of the crosslinking type resin suppressed decomposition of the decomposition type resin and resulted in close viscosities of rubber and resin which exhibited not only superior appearance, flexibility (feeling), mechanical strength and wear resistance but also enabled stabilized quality due to an improved productivity, and thus completed the present invention.

The following are detailed explanation on each component of the invention.

The crosslinkable rubber polymer (A) in the present invention preferably has a glass transition temperature (Tg) not higher than −30° C. and includes diene type rubbers such as polybutadiene, poly(styrene-butadiene) and poly(acrylonitrile-butadiene); saturated rubbers obtained by hydrogenation of the above described diene rubbers; isoprene rubber, chloroprene rubber, acrylic rubber such as poly(butyl acrylate); crosslinked or non-crosslinked rubbers such as ethylene-propylene copolymer rubber, ethylene-propylene-diene terpolymer rubber (EPDM) and ethyleneoctene copolymer rubber; and thermoplastic elastomers comprising the above described rubber components.

Among crosslinkable rubber polymers (A) in the present invention, ethylene/α-olefin copolymers are particularly preferable and those composed of ethylene and α-olefins with 3–20 carbon atoms are further preferable.

The above α-olefins with 3–20 carbon atoms include propylene, butene-1, pentene-1, hexene-1, 4-methylpentene-1, heptene-1, octene-1, nonene-1, decene-1, undecene-1, dodecene-1 and the like. Hexene-1, 4-tomethylpentene-1 and octene-1 are more preferable, and α-olefins with 6–12 carbon atoms are particularly preferable, and octene-1 is most preferable among others. Octene-1 has a superior effect on providing flexibility and mechanical strength to the copolymers obtained even in a small amount.

The ethylene/α-olefin copolymers (A') suitably used in the present invention is preferably manufactured with known metallocene catalysts.

Metallocene catalysts generally consist of cyclopentadienyl derivatives of metals in the group IV such as titanium and zirconium and cocatalysts, and not only have high catalytic activity but also provide a narrower molecular weight distribution of the polymer obtained and more uniform distribution of an α-olefin with 3–20 carbon atoms which is a comonomer in the copolymer, compared with Zieglar-Natta catalysts.

Copolymerization ratio of α-olefin in an ethylene/α-olefin copolymer (A') used in the present invention is preferably 1–60% by weight, more preferably 10–50% by weight, and most preferably 20–45% by weight. Copolymerization ratio of α-olefin exceeding 60% by weight greatly lowers hardness and tensile strength of the composition, on the other hand, copolymerization ratio lower than 1% by weight decreases flexibility and mechanical strength.

Preferable density of the ethylene/α-olefin copolymer (A') is in the range of 0.8–0.9 g/cm$^3$. Use of an olefin based elastomer with a density in this range provides an elastomer composition having superior flexibility and low hardness.

The ethylene/α-olefin copolymer (A')used in the present invention preferably has long chain branches. Presence of the long chain branches enables lowering density in comparison with the ratio (% by weight) of copolymnerized α-olefin, without lowering mechanical strength, and thus provides an elastomer with low density, low hardness and high strength. An olefin based elastomer with long chain branches is described in U.S. Pat. No. 5278272 and others.

In addition, the ethylene/α-olefin copolymer (A') preferably has a melting peak of DSC at room temperature or higher. (A') having such melting peak shows a stable morphology in a range of temperatures not higher than the melting peak, and provides superior handling characteristics and less stickiness.

Furthermore, melt index of (A) or (A') used in the present invention is preferably in the range of 0.01–100 g/10 min. (190° C., 2.16 kg-loaded), more preferably 0.2–10 g/10 min. The polymer with the melt index exceeding 100 g/10 min. has insufficient crosslinking property and the polymer with the melt index lower than 0.01 g/10 min. is not desirable due to lower fluidity and poor processability.

(A) or (A') used in the present invention may be a mixture of multiple components. In such case, it becomes possible to improve processsability further.

One of the preferable crosslinkable rubbery polymers of the present invention is a thermoplastic elastomer, and particularly preferable thermoplastic elastomer among others is a polystyrene thermoplastic elastomers such as a block copolymer consisting of an aromatic vinyl unit and a conjugated diene unit or a block copolymer with a partially hydrogenated or epoxydized unit of the above conjugated diene unit, and the like.

The aromatic vinyl monomer constituting the above described block copolymer includes styrene, α-methylstyrene, p-methylstyrene, p-chlorostyrene, p-bromostyrene, 2,4,5-tribromostyrene and the like, and styrene is most preferable. Styrene may be copolymerized with above described other minor aromatic vinyl monomers.

The conjugated diene unit constituting the above block copolymer includes 1,3-butadiene, isoprene and the like A preferable block structure of the block copolymer includes a linear block copolymer such as SB, $S(BS)_n$ (n being an integer of 1–3) and $S(BSB)_m$ (n is 1 or 2); a star-shaped block copolymer with B moiety as bonding center and expressed by $(SB)_nX$ (n being an integer of 3–6, X being a residual group of a coupling agent such as $SiCl_4$, $SnCl_4$ and a polyepoxy compound), wherein S and B designates a polymerized block of an aromatic vinyl unit and a polymerized block of a conjugated diene unit and/or a partially hydrogenated unit thereof, respectively. A linear block copolymer of SB two block type, SBS triblock type or SBSB tetra block type is preferable among others.

The above described hydrogenated copolymer, another preferable type of (A) of the invention, is a hydrogenated rubber obtained by hydrogenating the double bonds not less than 50% of total double bonds in an unsaturated rubber consisting of a polymer and/or a random copolymer having double bonds in main and side chains.

Degree of hydrogenation of the above described hydrogenated rubber is not less than 50% based on original total double bonds, preferably not less than 90%, more preferably not less than 95%, the amount of residual double bonds in the main chain is preferably 5% or less, and the amount of residual double bonds in side chains is preferably 5% or less. Typical examples of such rubbers include a partially or completely hydrogenated rubbery polymer of a diene type rubber such as polybutadiene, poly(styrene-butadiene), poly (acrylonitrile-butadiene), polyisoprene, polychloroprene and the like. Hydrogenated butadiene and isoprene based rubber are particularly preferred.

Such hydrogenated rubber is obtained by partial hydrogenation of the above described rubber by known hydrogenation processes. These hydrogenation processes include, for example, use of triisobutylboran catalysts described in F. L. Ramp. et al., J. Amer. Chem. Soc., 83, 4672 (1961), use of toluenesulfonylhydrazide described in Hung Yu Chen, J. Polym. Sci. Polym. Letter Ed., 15, 271 (1977), organocobalt-organoaluminium or organonickel-organoaluminium based catalysts in JP-B-42-8704 and the like. Particularly preferred hydrogenation processes are those disclosed in JP-A-59-133203 and JP-A-60-220147, where hydrogenation catalysts which effectively work in mild conditions of low temperature and low pressure are used, or a process disclosed in JP-A-62-207303, where a polymer is contacted with hydrogen in an inactive organic solvent in the presence of catalysts consisting of a bis (cyclopentadienyl)titanium compound and a hydrocarbon compound having Na, K, Rb or Cs atom.

Preferably, the hydrogenated rubber has a Mooney viscosity (ML) in the range of 20–90 and a viscosity of 5% by weight styrene solution at 25° C. (5% SV) in the range of 20–300 centipoise (cps). Particularly preferred 5% SV is 25–150 cps.

Heat quantity of an endothermic peak, an index of crystallinity of hydrogenated rubber, is controlled by the addition of a polar compound such as tetrahydrofuran or polymerization temperature. Lowering of the heat quantity of the endothermic peak is attained by increasing 1,2-vinyl content by means of increasing the amount of the polar compound or lowering polymerization temperature.

(A) or (A') used in the present invention may be a mixture of multiple components. In such case, it becomes possible to improve processability further.

The polypropylene based resin (B) in the present invention is mainly composed of propylene units and it is preferable to include both of a crosslinking type polypropylene resin (B-1) characterized by generation of a torque higher than $M_o$ after melting in the melting test specified in the specification, and a decomposition type polypropylene resin (B-2) characterized by generation a torque of not higher than $M_o$ after melting, wherein $M_o$ is a torque right after complete melting.

Any polypropylene resins may be used as (B-1) in the present invention so long as it satisfies melting characteristics in the melting test specified in the specification. Typical examples of (B-1) are a copolymer resin containing not less than 50% by weight of polypropylene (characterized by generation of a torque higher than $M_o$ after melting), and a particularly preferable comonomer copolymerizable with propylene is ethylene or an α-olefin with carbon atoms of 4–20. An ethylene propylene random copolymer resin is most preferable. When the ethylene component is present in main chains of the polymer, it acts as crosslinking sites and the polymer exhibits characteristics of a crosslinking type polypropylene resin.

Ratio of comonomer copolymerizable with propylene in (B-1) is preferably 1–49% by weight, more preferably 2–40% by weight, further more preferably 3–30% by weight, still further more preferably 5–20% by weight and most preferably 5–10% by weight.

Such (B-1) has flexural modulus specified by JIS K6758 of 100–10000 kgf/$cm^2$ and an endothermic peak in the range of 100–150° C. in differential scanning calorimetry (DSC method). When heat quantity of said endothermic peak is in the range of 10–600 J/g, the polymer exhibits superior appearance, flexibility (feeling), mechanical strength and thermal stability.

Any polypropylene resins may be used as (B-2) in the present invention so long as it satisfies melting characteristics in the melting test specified in the specification. Typical examples of (B-2) are a homopolymer resin or copolymer resin containing not less than 50% by weight of propylene (characterized by generation of a torque not higher than $M_o$, after melting), and a particularly preferable comonomer copolymerizable with propylene is ethylene or an α-olefin with carbon atoms of 4–20. An isotactic polypropylene homopolymer and an isotactic copolymer resin with other α-olefins such as butene-1, pentene-1, hexene-1 and the like are preferable and their block copolymer resin are particularly preferable.

Desirably (B-2) does not contain ethylene unit in the main chains of the polymer. However, when the ethylene/α-olefin copolymer exists as a dispersed phase like a propylene based block copolymer resin, characteristics of decomposition type polypropylene resin are observed.

Furthermore, preferable melt index of the polypropylene resin used in the present invention is in the range of 0.1–100 g/10 min. (230° C., 2.16 kg-loaded). The polymer with melt index over 100 g/10 min. shows insufficient heat resistance and mechanical strength, and the polymer with melt index lower than 0.1 g/10 min. is not desirable due to lower fluidity and poor processability.

Major component of (B-2) is an α-olefin and a multiple number of (B-1) and (B-2) components may be combined as (B).

In 100 parts by weight of the composition consisting of (A) or (A') and (B) or (B'), (B) or (B') is used in an amount of 1–99 parts by weight. The amount is preferably 5–90 parts by weight and more preferably 20–80 parts by weight. The amount of lower than 1 part by weight makes fluidity and processability of the composition worse and the amount of higher than 99 parts by weight is not desirable because of providing insufficient flexibility to the composition.

The partially or completely crosslinked rubber composition of the present invention is preferably attained by using a crosslinking agent (C). (C) includes a crosslinking initiator (C-1) as an essential component and a multifunctional monomer (C-2) and a monofunctional monomer (C-3), if necessary.

The amount of (C) described above is 0.01–10 parts by weight, preferably 0.05–3 parts by weight based on 100 parts by weight of the composition consisting of (A) or (A') and (B) or (B'). The amount of less than 0.01 part by weight gives insufficient crosslinking and the amount of over 10 parts by weight impairs appearance and mechanical strength of the composition.

The crosslinking initiator (C-1) described above includes a radical initiator such as organoperoxides, organoazo compounds and the like. A typical examples of (C-1) include peroxyketals such as 1,1-bis(t-butyl peroxy)-3,3,5-trimethylcyclohexane, 1,1-bis(t-hexyl peroxy)-3,3,5-trimethylcyclohexane, 1,1-bis(t-hexyl peroxy)cyclohexane, 1,1-bis(t-butyl peroxy)cyclododecane, 1,1-bis(t-butyl peroxy)cyclohexane, 2,2-bis(t-butyl peroxy)octane, n-buthyl-4,4-bis(t-butyl peroxy)butane, n-buthyl-4,4-bis(t-butyl peroxy)valelate and the like; dialkyl peroxides such as di-t-butyl peroxide, dicumil peroxide, t-butylcumil peroxide, α, α'-bis(t-butyl peroxy-m-isopropyl)benzene, α, α' -bis(t-butyl peroxy)-diisopropylbenzene, 2,5-dimethyl-2,5-bis(t-butyl peroxy) hexane, 2,5-dimethyl-2,5-bis(t-butyl peroxy)hexyne-3 and the like; diacyl peroxides such as acethyl peroxide, isobutyryl peroxide, octanoyl peroxide, decanoyl peroxide, lauroyl peroxide, 3,5,5-trimethylhexanoyl peroxide, benzoyl peroxide, 2,4-dichlorobenzoyl peroxide, m-toluoyl peroxide and the like; peroxy esters such as t-butyl peroxy acetate, t-butyl peroxy isobutylate, t-butyl peroxy-2-ethyl hexanoate, t-butyl peroxy laurylate, t-butyl peroxy benzoate, di-t-butyl peroxy isophthalate, 2,5-dimethyl-2,5-di(benzoyl peroxy)hexane, t-butyl peroxy maleic acid, t-butyl peroxy isopropylcarbonate, cumil peroxy octate and the like; and hydroperoxides such as t-butyl hydroperoxide, cumene hydroperoxide, diisopropylbenzene hydroperoxide, 2,5-dimethylhexane-2,5-dihydroperoxide, 1,1,3,3-tetramethylbutyl hydroperoxide and the like.

Among these compounds, 1,1-bis(t-butyl peroxy)-3,3,5-trimethylcycrohexane, di-t-butyl peroxide, dicumil peroxide, 2,5-dimethyl-2,5-bis(t-butyl peroxide)hexane and 2,5-dimethyl- 2,5-bis(t-butyl peroxide)hexyne-3 are preferable.

The amount of above described (C-1) used as a component (C) is preferably 1–80% by weight, more preferably 10–50% by weight. The amount of less than 1% by weight results in insufficient crosslinking and the amount of over 80% by weight lowers mechanical strength.

The multifunctional monomer (C-2), one of the crosslinking agent (C) of the present invention preferably has a radically polymerizable functional group, in particular, vinyl group. The number of functional groups is not less than two, and (C-2) having three or more functional groups in combination with (C-3) is particularly effective. Typical examples include divinylbenzene, triallyl isocyanulate, triallyl cyanulate, diacetonediacrylamide, poly(ethylene glycol)diacrylate, poly(ethylene glycol) dimethacrylate, trimethylolpropane trimethacrylate, trimethylolpropane triacrylate, ethylene glycol dimethacrylate, triethylene glycol dimethacrylate, diethylene glycol dimethacrylate, diisopropenylbenzene, p-quinonedioxime, p,p'-dibenzoylquinonedioxime, phenylmaleimide, allyl methacrylate, N,N'-m-phenylenebismaleimide, diallyl phthalate, tetraallyloxyethane, 1,2-polybutadiene and the like. Triallylisocyanulate is particularly preferred. These multifunctional monomers may be used in combination with other multifunctional monomers.

(C-2) described above is preferably used in 1–80% by weight in the component (C), more preferably in 10–50% by weight. The amount of less than 1% by weight results in insufficient crosslinking and the amount of over 80% by weight lowers mechanical strength.

The above described (C-3) used in the present invention is a vinyl monomer to be added to control crosslinking reaction rate and is preferably a radically polymerizable vinyl monomer including an aromatic vinyl monomer, an unsaturated nitrile monomers such as acrylonitrile and methacrylonitrile, an acrylate, a methacrylate, acrylic acid, methacrylic acid, maleic anhydride, an N-substituted maleimide and the like.

(C-3) described above is preferably used in 1–80% by weight in the component (C), more preferably in 10–50% by weight. The amount of less than 1% by weight results in insufficient crosslinking and the amount of over 80% by weight lowers mechanical strength.

(D) described above is preferably process oil such as paraffinic and olefinic types. These are used in 5–500% by weight, preferably in 10–150% by weight based on 100% by weight of the composition consisting of (A) or (A') and (B) or (B') to adjust hardness and flexibility of the composition. The amount of less than 5% by weight results in insufficient flexibility and processability and the amount of over 500% by weight is not desirable due to significant bleed out of the oil.

(A') in the present invention is included in the crosslinkable rubbery polymer described above and is an ethylene/α-olefin copolymer manufactured with a metallocene catalyst or a hydrogenated rubber.

When an ethylene/α-olefin copolymer composed of ethylene and an α-olefin with 3–20 carbon atoms manufactured with a metallocene catalyst, or a hydrogenated rubber prepared by hydrogenating not less than 50% of total double bonds in an unsaturated rubber consisting of a polymer and/or a random copolymer having double bonds in main and side chains, is used as (A') of the present invention, a combined use of the following (B-1') and (B-2') as (B') exhibits not only superior appearance, flexibility (feeling), mechanical strength, thermal stability and quality stability but also excellent scratch resistance: (B-1'); a polyolefin resin, preferably a polyethylene resin and/or a polyolefin resin comprising an α-olefin unit with 4–20 carbon atoms, (B-2'); a polyolefin resin, preferably a polypropylene block copolymer resin or a polypropylene homopolymer resin.

Any polyolefin resins may be used as (B-1') described above so long as it satisfies melting characteristics in the melting test specified in the specification, and includes also a polypropylene resin (B-1) described above. Typical examples of (B-1) are a homopolymer or copolymer resin (polyethylene resin) containing ethylene units of not less than 50% by weight, wherein an α-olefin with 3–20 carbon atoms is particularly preferable as a comonomer copolymerizable with ethylene, such as homopolymers of low density polyethylene, high density polyethylene and linear low density polyethylene or a copolymer resin with other α-olefins such as propylene, butene-1, pentene-1, hexene-1 and the like.

Any polyolefin resins may be used as (B-2') described above so long as it satisfies melting characteristics in the melting test specified in the specification and includes also a polypropylene resin (B-2) described above. A typical examples of (B-2') are a homopolymer or copolymer resin containing propylene units of not less than 50% by weight, (characterized by generation of a torque not higher than $M_o$ after melting), wherein ethylene or an α-olefin with 4–20 carbon atoms is particularly preferable as a comonomer copolymerizable with propylene, and a block copolymer resin is particularly preferable.

Desirably (B-2') does not contain ethylene units in the main chains of the polymer. However, if an ethylene/α-olefin copolymer is present as a dispersed phase like a propylene based block copolymer resin, characteristics of decomposition type polypropylene resin are observed.

An inorganic filler or a plasticizer may be added to the composition of the present invention up to a loading level not to impair its features. The inorganic filler to be used in the present invention includes calcium carbonate, magnesium carbonate, silica, carbon black, glass fiber, titanium dioxide, clay, mica, talc, magnesium hydroxide, aluminum hydroxide and the like. The plasticizer to be used includes poly(ethylene glycol), phthalates such as dioctyl phthalate (DOP) and the like. Other additives suitably used are organic and inorganic pigment, heat stabilizer, antioxidant, UV absorber, light stabilizer, flame retardant, silicone oil, antiblocking agent, foaming agent, antistatic agent and antibacterial agent.

For manufacturing the composition of the present invention, conventional equipment used for the manufacturing of usual resins and rubber compositions such as Banbury mixer, kneader, single screw extruder, twin screw extruder and the like may be used. Twin screw extruder, in particular, is preferably used to attain effective dynamic crosslinking. Twin screw extruder is more suitable to disperse (A) or (A') and (B) or (B') uniformly and finely, induce crosslinking reaction by the addition of other components and continuously produce the composition.

In the composition of the present invention, it is preferable to crosslink (A) with a crosslinking agent (C) in the presence of both of (B-1) and (B-2). In the crosslinking with (C) in the presence of (A) and (B-1), since both of (A) and (B-1) are crosslinked, appearance is impaired. In the crosslinking with (C) in the presence of (A) and (B-2), on the other hand, since (A) is crosslinked but (B-2) is decomposed, mechanical strength is lowered significantly. This tendency is also observed when (A), (B-1) and (B-2) are replaced with (A'), (B-1') and (B-2').

An example of suitable process for manufacturing of the thermoplastic composition of the present invention is as follows: (A) and (B) are charged into the hopper of an extruder after blending them well. (C) may be added either at initial stage together with (A) and (B) or from a second feed section of the extruder. Oil may also be fed either from the second feed section or from the first and the second feed sections dividedly. A part of (A) and (B) may be added from the second feed section of the extruder. Pellets of a composition of the present invention can be obtained by crosslinking (A) and (C) described above before melt mixing in an extruder, followed by melt blending by the addition of a softening agent (D) to perform crosslinking, mixing and dispersing sufficiently before taking out pellets from the extruder. Use of (A') and (B') instead of (A) and (B) also provides similar results.

A particularly preferable melt extrusion process is to use a twin screw extruder with L/D of 5–100, wherein L is the length of an extruder from its feed section for raw materials in the direction of die, and D is diameter of barrel. Preferable twin screw extruder has multiple feed sections, that is, a main feed section and a side feed section, at different lengths from the tip, and kneading zones between these feed sections and between the tip and the feed section locating closer to the tip, wherein the length of each kneading zone is 3D–10D.

In addition, the twin screw extruder, a manufacturing equipment used in the present invention, may be a co-rotating or a counter rotating screw type. It may also be any type of non-intermeshing, partially intermeshing or complete intermeshing type. A counter rotating and partially intermeshing type screw is preferable for uniform mixing of resin under low shear stress and at low temperatures. For mixing requiring relatively high shear force, a co-rotating and complete intermeshing type screw is desirable. For mixing requiring further higher shear force, a co-rotating and complete intermeshing type screw is desirable.

In the present invention, the morphology of the composition consisting of (A) and (B) or (A') and (B') is also important to attain an improved appearance and mechanical strength, and the component (A) or (A') component should be present as independent particles and the component (B) or (B') component as a continuous phase. To attain such a morphology, it is important to adopt high shear force and control crosslinking rate. Practically, it is important to decrease the amount of the crosslinking initiator and crosslinking promoter and carry out the reaction at a temperature as low as possible but not lower than the decomposition temperature of the cosslinking initiator and for a time as long as possible. Combined use of multi- and mono-functional monomers is preferred as crosslinking promoters. The excessive addition of the crosslinking initiators or promoters or use of the initiators or promoters with excessively high activity or a reaction condition at high temperature generates aggregations of the rubbery polymer and thus does not satisfy the requirement of the present invention. Crosslinking reaction can be controlled to proceed gently by making (A) or (A') absorb small amount of a softening agent (D) in advance and compounding the crosslinking initiator and promoter into (A) or (A'), and thus small and uniform particles can be generated.

As a manufacturing process for attaining superior appearance and enhanced mechanical strength, it is desirable to satisfy the following requirements for a degree of mixing M:

$$M=(\pi 2/2)(L/D)D^3(N/Q)$$

$$10\times10^6\leqq M\leqq 1000\times10^6$$

wherein, L is length of an extruder from its feed section for raw materials in the direction of die (mm), D is inner diameter of the extruder barrel (mm), Q is output rate (kg/h) and N is rotation speed of screw (rpm).

It is important that the degree of mixing M, $(\pi 2/2)(L/D)D^3(N/Q)$, satisfies $10\times10^6\leqq M\leqq 1000\times10^6$. M smaller than $10\times10^6$ impairs appearance due to enlarged and aggregated particles, whereas M over $1000\times10^6$ lowers mechanical strength due to excessive shear force.

Furthermore, melt temperatures should satisfy the following relationships to attain good appearance and mechanical strength: Melt mixing in an extruder is performed at melt temperature $T_2$ (° C.), then at melt temperature $T_3$ (° C.). In particular, first melt mixing is done at melt temperature $T_2$ (° C.) in the first extruder zone of the length of 0.1 L–0.5 L, wherein L is the length from the feed section in the direction of die of the extruder, then second melt mixing is done at melt temperature $T_3$ (° C.) in the second extruder zone.

In particular, preferable $T_1$ is 150–250° C. and melt temperatures in each extruder zone ($T_2$ and $T_3$) may be uniform or have a gradient.

$T_1$: Temperature (° C.) at which (° C.) decomposes by half in 1 min.

$$T_1-100<T_2<T_1+40$$

$$T_2+1<T_3<T_2+200$$

A rubbery composition thus obtained may be molded to various parts by means of any molding methods. Suitably, molding methods used are injection, extrusion, compression, blow, calender, foaming and the like.

The present invention is further described in detail by the following Examples and Comparative Examples, however, the invention should not be limited to them. Test methods used in Examples and Comparative Examples to evaluate physical properties are as follows.

(1) Tensile Strength at Break (MPa)

T-die-extruded sheet was evaluated at 23° C. in accordance with JIS K6251.

(2) Elongation at Break (%)

T-die-extruded sheet was evaluated at 23° C. in accordance with JIS K6251.

(3) MFR (g/10min.)

MFR was evaluated under the conditions of 190° C., 2.16 kg-loaded, in accordance with ASTM D 1238.

(4) Appearance

Appearance of sheet surface was evaluated according to the following criteria.

◎ excellent
○ good
Δ good but relatively rough
X rough as a whole without gloss (5) Flexibility (feeling)

Sheet surface was evaluated according to the following criteria.

◎ Excellently flexible and good feeling
○ good
Δ good but relatively hard
X hard as a whole and inferior feeling (6) Scratch Resistance A wedge (300 g, tip dimension of 10 mmL×1 mmW) was dropped onto a test sheet from a height of 5 cm. The scratch on the sheet surface was evaluated by visual assessment.

◎ excellent
○ good
Δ good but with visible scratch
X significant scratch (7) Wear Resistance A compression-molded sheet was prepared. A stainless plate of 5cm×5cm×2mm covered with felt cloth at the bottom was put on the sheet. Evaluation conditions are as follows.

Equipment: "Gakushin" type wear tester

Temperature: 23° C., ambient atmosphere

Stroke: 120 mm

Frequency: 1 reciprocation/2 sec

Load: 1 kg

Friction cloth: 100% cotton cloth, shirting No.3, folded in three (in accordance with JIS L0803) Contact area: 1 $cm^2$ Wear resistance was given by the number of reciprocation until the embossed marks on the surface disappear.

(8) Continuous Extrusion Stability (Quality stability) Continuous melt extrusion of a resin composition was carried out for 10 hours using a melt extruder. Tensile strength at break (Tb) was measured with the extruded sheets sampled every 1 hr during the extrusion. Continuous extrusion stability (quality stability) was evaluated by the following rate of change in Tb:

$$\text{Rate of change in } Tb\ (\%) = 100\times[(Tb)_1-(Tb)_0]/(Tb)_0$$

wherein, $(Tb)_0$ and $(Tb)_1$ are mean and maximum tensile strength at break, respectively.

(9) Melting Test

Melt mixing of a composition consisting of polyolefin resin/POX/DVB=100/0.67/1.33 in weight ratio was carried out at 200° C. for 10 min at 100 rpm using "LaboPlastomil" made by Toyo Seiki Seisaku-Syo Ltd. The resin in pellet state changed to semi-molten state when it was charged into "LaboPlastomil" and finally to completely molten state without remaining a definite shape, and the torque right after becoming completely molten state was expressed by $M_o$. FIG. 1 shows melting behavior after complete melting and the torque right after complete melting $M_o$.

(10) Analysis of Conjugated Diene Based Rubber

1) Degree of Hydrogenation (%)

Degree of hydrogenation was determined using NMR by the following procedure.

Firstly, polybutadiene rubber before hydrogenation was dissolved into deuterated chloroform, then integrated intensities of the signals at chemical shift 4.7–5.2 ppm (signal C0 for 1,2-vinyl proton, $=CH_2$) and 5.2–5.8 ppm (signal D0 for vinyl proton, $=CH—$) were determined using FT-NMR (270M, made by JEOL Ltd.). From these data, (V) was calculated by the following formula.

$$(V)=[0.5C0/\{0.5C0+0.5\ (D0-0.5C0)\}]\times 100$$

Then, a partially hydrogenated polybutadiene rubber was dissolved into deuterated chloroform. Integrated intensities of the signals at chemical shift 0.6–1.0 ppm (signal A1 for methyl group proton of hydrogenated 1,2-bond, $—CH_3$), 4.7–5.2 ppm (signal C1 for non-hydrogenated 1,2-vinyl proton, $=CH_2$) and 5.2–5.8 ppm (signal D1 for non-hydrogenated vinyl proton, $=CH—$) were determined similarly using FT-NMR.

Assuming the following:

$$p=0.5C0/(0.5C1+A1/3)$$

$$A11=pA1,\ C11=pC1,\ D11=pD1$$

then, degree of hydrogenation of 1,2-vinyl bonds (B) and degree of hydrogenation of 1,4-double bonds (C.) were calculated by the following formulas:

$$(B) = [(A11/3)/\{A11/3 + C11/2\}]\times 100$$

$$(C) = [\{0.5(D0 - 0.5\,C0) - 0.5(D11 - 0.5\,C11)\}/0.5(D0 - 0.5\,C0)]\times 100$$

Finally, degree of hydrogenation of the whole butadiene parts (A) was calculated by the following formula:

$$(A)=(V)\times(B)/100+[100-(V)]\times(C)\times 100$$

2) Micro Structure

Each microstructure content is given by the following formulas using the notations defined above.

$$\text{Content of non-hydrogenated 1,2-vinyl } (\%)=(V)\times(B)/100$$

$$\text{Content of non-hydrogenated 1,4-bond } (\%)=\{100-(V)\}\times(C)/100$$

$$\text{Content of hydrogenated 1,2-vinyl } (\%)=(V)\times\{100-(B)\}/100$$

$$\text{Content of hydrogenated 1,4-bond } (\%)=\{100-(V)\}\times\{100-(B)\}/100$$

(11) Light Stability

Appearance of sheet was evaluated by visual assessment after the irradiation with Xenon light according to the following criteria.

Test instrument: ATLAS CI35W Weatherometer (made by ATLAS Electric Devices Co., U.S.A)

Irradiation conditions: Temperature inside the instrument 55° C., humidity 55%, no rain, Xenon light with a wavelength of 340 nm and an energy of 0.30 $W/m^2{}_1$, irradiation time 300 hrs (in accordance with JIS K7102).

◎ Excellent

○ good

Δ good but relatively rough

X rough as a whole without gloss

Material components used in Examples and Comparative Examples are as follows.

(a) Rubbery Polymers

① Ethylene/octene-1 copolymer (TPE-1)

The polymer was prepared with a metallocene catalyst disclosed in JP-A-3-163088. Composition ratio of ethylene/octene-1 in the copolymer was 72/28 (% by weight) (referred to as TPE-1).

② Ethylene/octene-1 copolymer (TPE-2)

The polymer was prepared with a conventional Zieglar-Natta catalyst. Composition ratio of ethylene/octene-1 in the copolymer was 72/28 (% by weight) (referred to as TPE-2).

③ Ethylene/propylene/dicyclopentadiene copolymer (TPE-3)

The polymer was prepared with a metallocene catalyst disclosed in JP-A-3-163088. Ratio of ethylene/propylene/dicyclopentadiene in the copolymer was 72/24/4 (% by weight) (referred to as TPE3).

④ Styrene/ethylene-butene/styrene copolymer (SEBS)

Trade name is Tuftec, manufactured by Asahi Chem. Ind. Co., Ltd. (referred to as SEBS).

⑤ Styrene/butadiene copolymer (SB)

Trade name is Tufprene, manufactured by Asahi Chem. Ind. Co., Ltd. (referred to as SB).

⑥ Hydrogenated rubber

The polymers were prepared by hydrogenation of polybutadiene rubber or poly(styrene-butadiene) copolymer rubber, wherein the degree of hydrogenation was varied from 0 to 100%.

(b) Polyolefin resin

① Polypropylene (PP-1): Decomposition type (B-2)

Isotactic polypropylene homopolymer with MFR of 30 g/min. (230° C., 2.16 kg-loaded, in accordance with ASTM D1238) produced by Japan Polyolefin Co. Ltd. (referred to as PP-1).

② Polypropylene (PP-2): Decomposition type (B-2)

Isotactic polypropylene homopolymer with MFR of 0.5 g/min. (230° C., 2.16 kg-loaded, in accordance with ASTM D1238) produced by Japan Polyolefin Co. Ltd. (referred to as PP-2)

③ Ethylene (ET)/propylene (PP) Copolymer Resin: Decomposition Type (B-2)

Block ET-PP resin with ET/PP =7/93% by weight produced by Japan Polyolefin Co. Ltd. (referred to as EP-0).

④ Ethylene (ET)/propylene (PP) Copolymer Resin: Crosslinking Type (B-1)

Random ET-PP resin with ET/PP 7/93% by weight produced by Japan Polyolefin Co. Ltd. (referred to as EP-1). Trade name is PM940M.

Various random ET-PP copolymer resins with different comonomer ratios of ethylene and propylene were prepared based on EP-1 by the known production process.

⑤ Low Density Polyethylene: Crosslinking Type (B-1)

Suntec LD manufactured by Asahi Chem. Ind. Co., Ltd. (referred to as LDPF).

(c) Crosslinking Agent

1) Crosslinking Initiator: (C-1)

2,5-Dimethyl-2,5-bis(t-butylperoxy)hexane manufactured by NOF Corp. (Trade name is Perhexa 25B) (referred to as POX-1).

2) Crosslinking Initiator): (C-1)

2,5-Dimethyl-2,5-bis(t-butylperoxy)hexyne manufactured by NOF Corp. (Trade name is Perhexyn 25B) (referred to as POX-2).

3) Multifunctional Monomer (C-2):

Divinylbenzene (referred to as DVB) manufactured by Wako Pure Chemical Ind. Ltd.

4) Multifunctional Monomer (C-2):

Triallylisocyanulate (referred to as TAIC) manufactured by Nippon Kasei Chemical Co. Ltd.

5) Multifunctional monomer (C-2):

N,N'-m-Phenylenebismaleimide (referred to as PMI) manufactured by Ouchi-Shinko Chemical Ind. Co., Ltd.

6) Monofunctional Monomer (C-3):

Methyl methacrylate (referred to as MMA) manufactured by Asahi Chem. Ind. Co., Ltd.

7) Monofunctional Monomer (C-3):

Styrene (referred to as ST) manufactured by Asahi Chem. Ind. Co., Ltd.

(d) Paraffinic oil: Daiana Process Oil, PW-90 (referred to as MO) manufactured by Idemitsu Kosan Co., Ltd.

REFERENCE EXAMPLES 1–5

A composition consisting of a thermoplastic resin/POX/DVB=100/0.67/1.33 in weight ratio was melt-mixed at 200° C. for 10 min at 100 rpm using "LaboPlastomil" made by Toyo Seiki Seisaku-Syo Ltd. The results are shown in FIG. 1. Thermoplastic resins used are as follows.

Thermoplastic resins used in Reference Example 1–5

Reference Example 1 PP-1

Reference Example 2 EP-1

Reference Example 3 PP-1/EP-1=50/50

Reference Example 4 PP-1/LDPE=90/10

Reference Example 5 PP-1/LDPE=50/50

EP-1 (Reference Example 2) is a typical crosslinking type thermoplastic resin (B-1) characterized by providing a torque higher than $M_o$ (a torque right after complete melting) after melting, in a melting test in the presence of an organic peroxide specified by the specification (temperature condition being at 200° C.), and PP-1 (Reference Example 1) is a typical decomposition type thermoplastic resin (B-2) characterized by providing a torque not higher than $M_o$ after melting.

FIGS. 1A–1E show that combined use of crosslinking type/decomposition type thermoplastic resins suppresses decomposition of the latter and on the other hand suppresses crosslinking reaction of the former, and thus thermal stabilization of the thermoplastic resin is promoted.

Example 1 and Comparative Examples 1–2

The same procedures as in Reference Example 1 were repeated except that the compositions described in Table 1 were used, and decomposition rates of component (B) were determined from the rates of change in MFR. The decomposition rate is defined as a ratio $MI_t$/ $MI_0$, wherein $MI_o$ is the value of MFR where the components (C) and (D), both of which influence crosslinking/decomposition, are not added, and $MI_1$ is the value of MFR where those components are added. Results are shown in Table 1 and FIG. 2.

Figure 2:
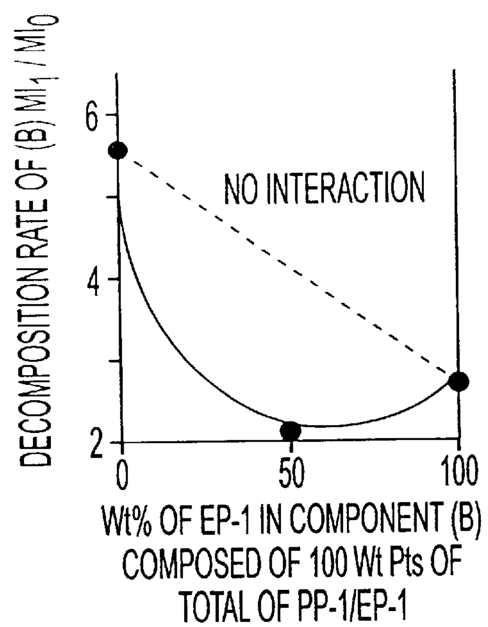
FIG. 2 shows relations between composition ratio PP-1/EP-1 in a component (B) and decomposition ratio in Example 1 and Comparative Examples 1–2.

Table 1 and FIG. 2 show that the combined use of crosslinking type/decomposition type thermoplastic resins provides lower decomposition rate $MI_t/MI_0$ compared with those in their single use and thus improved heat stability.

EXAMPLE 2 AND COMPARATIVE EXAMPLES 3–4

The same procedures as in Reference Example 1 were repeated except that the compositions described in Table 2 were used. However, the reaction was carried out for 10 min. with the component (A)–(D) fed together at first, then for further 10 min. under the same conditions with the component (E) fed additionally.

Sheets of 2 mm thick were prepared from the compositions thus obtained by compression molding at 200° C., and used for the evaluation of various characteristics. Results are shown in Table 2 and FIG. 3.

Figure 3:
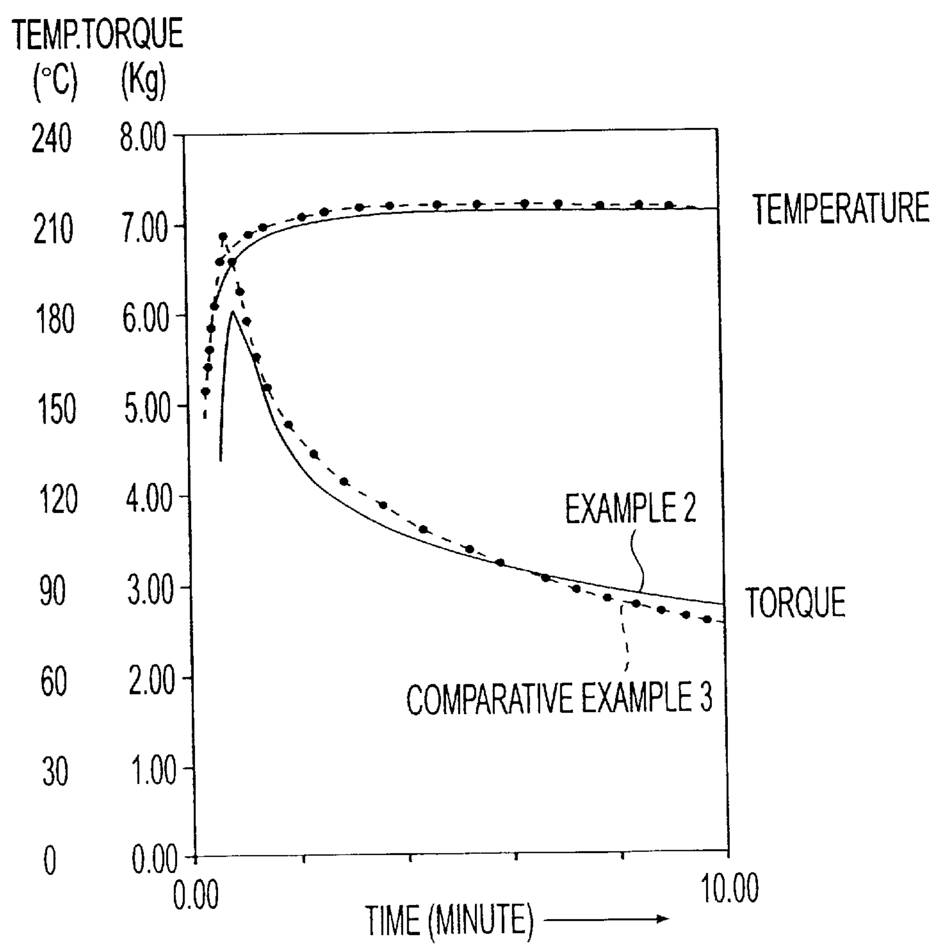
FIG. 3 shows changes of torque (kgm) with temperature (° C.) by "LaboPlastomil" in Example 2 (solid line) and Comparative Example 3 (dotted line).

According to Table 2 and FIG. 3, use of PP-2 of decomposition type as the component (B) (Comparative Example 3) shows a rapid drop of torque after the dynamic crosslinking reaction of (A), whereas combined use of decomposition type PP-2/crosslinking type EP-1 as the component (B) (Example 2) mildens the above described drop of torque, suppresses decrease in molecular weight of the component (B), and thus results in the improvement of mechanical characteristics.

EXAMPLES 3–10 and COMPARATIVE EXAMPLES 5–9

Compositions described in Tables 3 and 4 were melt-mixed under the following standard conditions and procedures using a twin screw extruder (25 mmϕ, L/D=47) composed of 11 blocks having a feed section at the barrel center. Double thread screw with a mixing zone in front and in rear of the feed section was used as a screw.

When MO is used, melt mixing was carried out with MO charged by pumping from a feed section in the center of the extruder.

Standard melting conditions:

1) Melt extrusion temperature: 220° C. constant

2) Output rate Q=12 kg/h

3) Inner diameter of extruder barrel D=25 mm

4) L/D=47 (L is extruder length in mm)

5) Rotation speed of screw N=280 rpm

Sheets of 2 mm thick were prepared from the compositions thus obtained using a T die extruder at 200° C., and used for the evaluation of various characteristics.

Results are shown in Tables 3 and 4.

Tables 3 and 4 show that combined use of decomposition type/crosslinking type thermoplastic resins as the component (B) or (B') stabilizes melt viscosity and improves not only extrusion stability but also mechanical characteristics and appearance.

EXAMPLES 11–20

The same procedures as in Example 5 were repeated except that hydrogenated rubber, TPE-1, TPE-2 and TPE-3 were used as the component (A). Results are shown in Table 4.

According to Table 4, use of an ethylene/α-olefin copolymer composed of ethylene and an α-olefin with 3–20 carbon atoms manufactured with a metallocene catalyst and/or a hydrogenated rubber prepared by hydrogenating not less than 50% of total double bonds in an unsaturated rubber consisting of homopolymer and/or random copolymer having double bonds in main and side chains, provides superior tensile strength at break, appearance, flexibility and scratch resistance.

EXAMPLES 21–34

The same procedures as in Example 5 were repeated except the following. In accordance with the following definitions, firstly melt mixing was carried out at melt temperature $T_2$ (° C.), then at melt temperature $T_3$ (° C.). In addition, (C-2) or (C-3) described in Table 5 was used instead of DVB. Results are shown in Table 5. In the case of the combined use of (C-2) and (C-3), the both were used in an equivalent amount.

Table 3 shows that manufacturing under the following melt conditions provides improved tensile strength at break, appearance, flexibility and scratch resistance.

$T_1$(° C.)=temperature at which (C) decomposes by half in 1 min.

$$T_1-100<T_2<T_1+40$$

$$T_2+1<T_3<T_2+200$$

EXAMPLES 35–37

The same procedures as in Example 5 were repeated except for changing the degree of mixing M as defined below:

$$M=(\eta^2/2)(L/D)D^3(N/Q)$$

$$10\times10^6\leqq M\leqq1000\times10^6$$

wherein, L (mm) is extruder length from a feed section in the direction of die, D (mm) is inner diameter of an extruder barrel, Q (kg/h) is output rate, N (rpm) is rotation speed of screw, D=25 mm and L/D=47. Results are shown in Table 6.

Table 6 shows that manufacturing with the degree of mixing M in the range of $10\times10^6\leqq M\leqq1000\times10^6$ provides improved tensile strength at break, appearance, flexibility and scratch resistance.

EXAMPLES 38–57

The same procedures as in Example 5 were repeated except that (A) and (B) described in Table 7 were used instead of (A) and (B) in Example 5. Table 7 shows evaluation results of wear resistance.

Table 7 shows that use of a crosslinking type rubbery polymer manufactured with a metallocene catalyst improves wear resistance.

EXAMPLES 58–66

The same procedures as in Example 5 were repeated except that (A) and (B) described in Table 8 were used instead of (A) and (B) in Example 5 or addition method for (B) was changed as described below. Table 8 shows evaluation results.

In Examples 58–63, all components other than MO were blended together and melt extruded in the same manner as in the Examples and Comparative Examples shown in Table 1–7. In Examples 64–66, on the other hand, (A), (C), (D) and a part of (B-1) or (B-2) were crosslinked at the first stage, followed by mixing of the thus crosslinked compositions with the rest of (B-1) or (B-2), and then melt extruded.

Table 7 shows that it is preferable to crosslink (A) with a crosslinking agent (C) in the presence of both of (B-1) and (B-2).

TABLE 1

| | Example | Comparative Example | |
|---|---|---|---|
| Component | 1 | 1 | 2 |
| Weight ratio | | | |
| (A) SEBS | | 2 | |
| (B) Crosslinking Type EP-1 (B-1) | 49 | 0 | 98 |
| Decomposition Type PP-1 (B-2) | 49 | 98 | 0 |
| (C) POX-1 | | 0.5 | |
| DVB | | 1.0 | |
| MFR ($MI_1$) | 28 | 76 | 35 |
| Decomposition rate of (B) * | 2.1 | 5.6 | 2.6 |

* Ratio of MFR ($MI_1$) to MFR ($MI_0$), MFR ($MI_0$) being the value without (C) and (D).

TABLE 2

| | Example | Comparative Example | |
|---|---|---|---|
| Component | 2 | 3 | 4 |
| Weight ratio | | | |
| (A) TPE-1 | | 70 | |
| (B) Crosslinking Type EP-1 (B-1) | 15 | 0 | 30 |
| Decomposition Type PP-1 (B-2) | 15 | 30 | 0 |
| (C) POX-1 | | 0.5 | |
| DVB | | 1.0 | |
| (D) MO | | 45 | |
| Tensile Strength at Break Tb (MP) | 8.0 | 5.0 | 5.5 |
| Elongation at Break (%) | 550 | 420 | 430 |
| Appearance | ◎ | ○ | X |
| Flexibility | ◎ | X | ◎ |

TABLE 3

| Component | | Example | | | | | | | |
|---|---|---|---|---|---|---|---|---|---|
| | | 3 | 4 | 5* | 6 | 7 | 8* | 9 | 10 |
| Weight ratio | (A) | | 50 TPE-1 | | 50 TPE-2 | 50 TPE-3 | 50 TPE-1 | 50 SEBS | 50 SB |
| | (B) Crosslinking Type B-1 | | | 25 EP-1 | | | 25 LDPE | 25 EP-1 | |
| | Decomposition Type B-2 | | | | 25 PP-2 | | | 25 PP-2 | |
| | (C) POX-1 | 0.5 | 0.5 | | | | 0.5 | | |
| | DVB | 0 | 1.0 | | | | 1.0 | | |
| | (D) MO | 0 | 0 | | | | 45 | | |
| Tensile Strength at Break Tb (MPa) | | 17.0 | 20.0 | 15.0 | 12.0 | 11.5 | 14.0 | 19.0 | 18.0 |
| Elongation at Break (%) | | 670 | 650 | 650 | 450 | 400 | 700 | 800 | 750 |
| Appearance | | ◎ | ◎ | ◎ | ○ | ○ | ◎ | ◎ | ◎ |
| Flexibility | | ○ | ○ | ◎ | ○ | ○ | ◎ | ○ | ○ |
| Extrusion Stability # | | 5 | 7 | 2 | 7 | 8 | 3 | 4 | 5 |

| Component | | Comparative Example | | | | |
|---|---|---|---|---|---|---|
| | | 5 | 6 | 7 | 8 | 9 |
| Weight ratio | (A) | | 50 TPE-1 | | 50 SEBS | 50 SB |
| | (B) Crosslinking Type B-1 | | 50 EP-1 | 60 LDPE | | 60 EP-1 |
| | Decomposition Type B-2 | 50 PP-2 | | | 50 PP-2 | |
| | (C) POX-1 | | | 0.5 | | |
| | DVB | | | 1.0 | | |
| | (D) MO | | | 45 | | |
| Tensile Strength at Break Tb (MPa) | | 8.0 | 7.0 | 1.0 | 16.0 | 17.0 |
| Elongation at Break (%) | | 320 | 350 | 50 | 500 | 600 |
| Appearance | | ◎ | X | X | ◎ | X |
| Flexibility | | X | ○ | X | X | ○ |
| Extrusion Stability # | | 58 | 65 | 40 | 70 | 60 |

*More preferable examples are exhibited.

TABLE 4

| | Example | | | | | | | | | | | | | |
|---|---|---|---|---|---|---|---|---|---|---|---|---|---|---|
| | 11 | 12 | 13 | 14 | 15 | 16 | 17 | 18 | 19 | 20 | 21 | 22 | 23 | 24 |
| Component (A) | | | | | | | | | | | | | | |
| Kind of Material | | | | Hydrogenated Rubber | | | | TPE-1 | TPE-2 | TPE-3 | | Hydrogenated Rubber | | |
| Degree of Hydrogenation (%) | 50 | 85 | 90 | 95 | 100 | 0 | 45 | | | | 50 | 85 | 95 | 50 |
| Content of Remaining Double-bonds in Main Chains (%)* | 44 | 11 | 8 | 4.5 | 0 | 85 | 37 | | | | 44 | 11 | 4.5 | 44 |
| Content of Remaining Double-bonds in Side Chains (%)** | 6 | 4 | 2 | 0.5 | 0 | 15 | 8 | | | | 6 | 4 | 0.5 | 6 |
| Composition before Hydrogenation BD/ST*** | 100/0 | 100/0 | 100/0 | 100/0 | 100/0 | 100/0 | 100/0 | | | | 80/20 | 80/20 | 80/20 | 90/10 |
| Tensile Strength at Break (MPa) | 10.0 | 11.5 | 12.0 | 12.0 | 13.0 | 9.5 | 9.0 | 15.0 | 10.5 | 9.0 | 11.0 | 12.5 | 13.1 | 10.5 |
| Appearance | ○ | ○ | ◎ | ◎ | ◎ | ○ | ○ | ◎ | ◎ | ◎ | ◎ | ◎ | ◎ | ◎ |
| Flexibility | ◎ | ◎ | ◎ | ◎ | ◎ | ○ | ○ | ◎ | ◎ | ◎ | ◎ | ◎ | ◎ | ◎ |
| Scratch Resistance | Δ | ○ | ◎ | ◎ | ◎ | Δ | Δ | ◎ | Δ | Δ | ○ | ◎ | ◎ | Δ-○ |
| Light Stability | Δ | ○ | ◎ | ◎ | ◎ | Δ | Δ | ◎ | ◎ | Δ | ○ | ◎ | ◎ | Δ-○ |

*1,4-Double Bond Content
**1,2-Vinyl Content
***BD Polybutadiene, ST: Polystyrene

TABLE 5

| | | Example | | | | | | | | | |
|---|---|---|---|---|---|---|---|---|---|---|---|
| | | 25 | 26 | 27 | 28 | 29 | 30 | 31 | 32 | 33 | 34 |
| (C-1) | Material | POX-1 | POX-1 | POX-1 | POX-1 | POX-1 | POX-2 | | | POX-1 | |
| | $T_1$ | 180 | 180 | 180 | 180 | 180 | 194 | | | 180 | |
| | $T_2$ | 150 | 85 | 215 | 150 | 150 | 150 | | | 150 | |
| | $T_3$ | 220 | 220 | 220 | 155 | 345 | 220 | | | 220 | |

TABLE 5-continued

| | Example | | | | | | | | | |
|---|---|---|---|---|---|---|---|---|---|---|
| | 25 | 26 | 27 | 28 | 29 | 30 | 31 | 32 | 33 | 34 |
| (C-2) | | | DVB | | | | TAIC | PMI | — | TAIC |
| (C-3) | | | — | | | | — | — | MMA | MMA |
| Tensile Strength at Break (MPa) | 13.5 | 12.0 | 11.5 | 11.0 | 10.5 | 13.0 | 11.5 | 11.0 | 9.0 | 13.0 |
| Appearance | ◎ | ◎ | ○ | ◎ | ○ | ○ | ○ | ○ | ◎ | ◎ |
| Flexibility | ◎ | ◎ | ◎ | ◎ | ◎ | ◎ | ◎ | ◎ | ◎ | ◎ |
| Scratch Resistance | ◎ | ◎ | ◎ | ◎ | ◎ | ◎ | ◎ | ◎ | ○ | ◎ |

In the case of POX-1: $T_1 = 180$, $80 < T_2 < 220$, $T_2 + 1 < T_3 < T_2 + 200$
In the case of POX-2: $T_1 = 194$, $94 < T_2 < 234$, $T_2 + 1 < T_3 < T_2 + 200$

TABLE 6

| | Example | | |
|---|---|---|---|
| | 35 | 36 | 37 |
| Manufacturing Conditions | | | |
| N | 300 | 300 | 2750 |
| Q | 10 | 100 | 10 |
| M (× $10^6$) | 109 | 11 | 997 |
| Tensile Strength at Break (MPa) | 12.0 | 11.0 | 10.0 |
| Appearance | ◎ | ○ | ◎ |
| Flexibility | ◎ | ◎ | ◎ |
| Scratch Resistance | ◎ | ◎ | ◎ |

TABLE 7

| | | | Example | | | | | | | | | |
|---|---|---|---|---|---|---|---|---|---|---|---|---|
| | | | 38 | 39 | 40 | 41 | 42 | 43 | 44 | 45 | 46 | 47 |
| (A) | Material | | | | | | TPE-1 | | | | | |
| | Content (wt %) | | 30 | 40 | 50 | 60 | 70 | 80 | 60 | 40 | 60 | 40 |
| ((B) | (B-1) | EP-1 | 35 | 30 | 25 | 20 | 15 | 10 | 10 | 15 | | |
| | | LDPE | | | | | | | 10 | 15 | 20 | 30 |
| | (B-2) | EP-0 | 35 | 30 | 25 | 20 | 15 | 10 | 20 | 30 | 20 | 30 |
| Wear Resistance[1] | | | 1100 | 1000 | 850 | 750 | 650 | 550 | 850 | 1100 | 950 | 1200 |

| | | | Example | | | | | | | | | |
|---|---|---|---|---|---|---|---|---|---|---|---|---|
| | | | 48 | 49 | 50 | 51 | 52 | 53 | 54 | 55 | 56 | 57 |
| (A) | Material | | | | | | TPE-2 | | | | | |
| | Content (wt %) | | 30 | 40 | 50 | 60 | 70 | 80 | 60 | 40 | 60 | 40 |
| ((B) | (B-1) | EP-1 | 35 | 30 | 25 | 20 | 15 | 10 | 10 | 15 | | |
| | | LDPE | | | | | | | 10 | 15 | 20 | 30 |
| | (B-2) | EP-0 | 35 | 30 | 25 | 20 | 15 | 10 | 20 | 30 | 20 | 30 |
| Wear Resistance[1] | | | 600 | 590 | 430 | 320 | 200 | 100 | 400 | 520 | 430 | 480 |

[1]Wear Resistance: Shown by the number of stroke until embossed marks disappear.

TABLE 8

| | | | Example | | | | | | | | |
|---|---|---|---|---|---|---|---|---|---|---|---|
| | | | 58 | 59 | 60 | 61 | 62 | 63 | 64 | 65 | 66 |
| First Step | | | | | | | | | | | |
| (A) | TPE-1 | | | | | | 60 | | | | |
| (B) | (B-1) | Content | | | 20 | | | 30 | 10 | 0 | 20 |
| | | C. R.[1] of Etylene/Propylene | 1/99 | 5/95 | 10/90 | 20/80 | 49/51 | 10/90 | | — | 10/90 |
| | (B-2) | EP-0 | | | 20 | | | 10 | 20 | 20 | 0 |

TABLE 8-continued

| | | Example | | | | | | | | |
|---|---|---|---|---|---|---|---|---|---|---|
| | | 58 | 59 | 60 | 61 | 62 | 63 | 64 | 65 | 66 |
| (C) POX-1 | | | | | | 0.5 | | | | |
| TAIC | | | | | | 1.0 | | | | |
| (D) MO | | | | | | 45 | | | | |
| Second Step | | | | | | | | | | |
| (B) (B-1) | Content | | | | | | | 10 | 20 | |
| | C. R.[1] of Etylene/Propylene | — | — | — | — | — | — | 10/90 | 10/90 | — |
| (B-2) | EP-0 | — | — | — | — | — | — | — | — | 20 |
| Flexibility | | Δ | ○ | ◎ | ◎ | ◎ | ◎ | ○ | Δ | Δ |
| Extrusion Stability | | 3 | 2 | 3 | 5 | 2 | 5 | 7 | 11 | 12 |
| Scratch Resistance | | ◎ | ◎ | ◎ | ◎ | ◎ | ◎ | ○ | Δ | Δ |
| Tensile Strength at Break (MPa) | | 11 | 14 | 16 | 18 | 21 | 20 | 16 | 7 | 11 |
| Appearance | | Δ | ○ | ◎ | ◎ | ◎ | ◎ | ○ | Δ | Δ |

[1]C. R.: Copolymerization Ratio

What is claimed is:

1. A thermoplastic rubber composition which comprises (A) 1–99 parts by weight of a crosslinkable rubbery polymer having a glass transition temperature not higher than −30° C. and comprising at least one selected from the group consisting of a diene type rubber, a hydrogenated rubber obtained by hydrogenating not less than 50% of total double bonds of said diene type rubber, an ethylene/α-olefin copolymer rubber, an ehthylene-propylene-diene terpolymer rubber, an isoprene rubber, a chloroprene rubber, an acrylic rubber, and a thermoplastic elastomer comprising a rubber component described above and (B) 1–99 parts by weight of a polypropylene resin (B) containing propylene units of not less than 50% by weight and units of ethylene or an α-olefin with 4–20 carbon atoms as a comonomer copolymerizable with propylene (total amount of (A) and (B) being 100 parts by weights), said thermoplastic rubber composition being crosslinked, wherein said (B) comprises a polypropylene resin (B-1) which generates a torque higher than $M_o$ after melting, and a polypropylene resin (B-2) which generates a torque not higher than $M_o$ after melting, in a melting test of said (B) in the presence of an organic peroxide (temperature condition being at 200° C.), and $M_o$ being a torque right after complete melting.

2. The thermoplastic rubber composition according to claim 1, wherein said (A) comprises a styrenic and/or olefinic rubbery polymer.

3. The thermoplastic rubber composition according to claim 2, wherein said (A) comprises an ethylene/α-olefin copolymer of ethylene and an α-olefin with 3–20 carbon atoms.

4. The thermoplastic rubber composition according to claim 3, wherein said (A) is an ethylene/α-olefin copolymer prepared with a metallocene catalyst.

5. The thermoplastic rubber composition according to claim 1, wherein said (B-1) is a polypropylene random copolymer resin and said (B-2) is a polypropylene block copolymer resin or a polypropylene homopolymer resin.

6. The thermoplastic rubber composition according to claim 1, wherein said (B-1) has a flexural modulus of 100–10000 kgf/cm$^2$ as specified by JIS K6758 and an endothermic peak in a temperature range of 100–150° C., and a heat quantity of said endothermic peak being in a range of 10–600 J/g, in a differential scanning calorimetry (DSC method).

7. The thermoplastic rubber composition according to claim 1, wherein said composition is prepared by mixing said (A), said (B-1) and said (B-2), and then crosslinking the mixture with a crosslinking agent (C).

8. A thermoplastic rubber composition which comprises (A') 1–99 parts by weight of an ethylene/α-olefin copolymer rubber of ethylene and an α-olefin with 3–20 carbon atoms manufactured with a metallocene catalyst or a hydrogenated rubber obtained by hydrogenating not less than 50% of total double bonds of a diene type rubber, and (B') 1–99 parts by weight of a polyolefin resin (total amount of (A') and (B') being 100 parts by weights), said thermoplastic rubber composition being crosslinked, wherein said (B') comprises a polyolefin resin (B-1') which generates a torque higher than $M_o$ after melting, and a polyolefin resin (B-2') which generates a torque not higher than $M_o$ after melting, in a melting test of said (B') in the presence of an organic peroxide (temperature condition being at 200° C.), and $M_o$ being a torque right after complete melting.

9. The thermoplastic rubber composition according to claim 8, wherein said (B-1') is a polyethylene resin and/or a polyolefin resin comprising units of an α-olefin with 4–20 carbon atoms and said (B-2') is a polypropylene block copolymer resin or polypropylene homopolymer resin.

10. The thermoplastic rubber composition according to claim 9, wherein said (B-1') is a random copolymer of polyethylene and an α-olefin with 4–20 carbon atoms.

11. The thermoplastic rubber composition according to claim 8, wherein said composition is prepared by mixing said (A'), said (B-1') and said (B-2'), and then crosslinking the mixture with a crosslinking agent (C).

* * * * *